Dec. 27, 1966 A. C. GILES 3,293,682

REPRODUCING TAPE

Filed July 10, 1964

INVENTOR

AQUILA C. GILES

BY

Kane, Dalsimer + Kane

ATTORNEYS

United States Patent Office 3,293,682

Patented Dec. 27, 1966

3,293,682
REPRODUCING TAPE

Aquila C. Giles, Southampton, N.Y., assignor to Trans-Lux Corporation, New York, N.Y., a corporation of Delaware Filed July 10, 1964, Ser. No. 381,771
2 Claims. (Cl. 15—210)

This invention relates to a structurally and functionally improved reproducing tape and especially a tape or record intended for use in connection with stock tickers or similar indicia imprinting machines.

As is well known with respect to machines of this nature, considerable difficulty has been experienced in that the imprinted tape is frequently employed in conjunction with a projecting apparatus to cause indicia images to traverse a screen. The difficulty arises in that the apparatus embodies a guidance system to maintain the tape in proper relationship to a light source, lenses, reflecting mirrors, etc. To maintain it in a proper path, guides are employed, especially under conditions of high-speed operation. Thus, guides may become partially clogged with material to a point where the tape will no longer pass along a precisely definite path; especially where one after another tape successively feeds through the apparatus without interim cleaning of the guides.

By means of the present teachings, it will not be necessary to clean the guides by accepted procedures. Rather with the threading of a fresh tape through the guides of the apparatus, those guides will be cleared of foreign matter.

Thus, with no expenditure of time and consequent lapse in the reproduction sequence, the apparatus may continue to function; the person servicing the machine—by the mere operation of threading a fresh tape—accomplishing the desired result.

Another object is that of producing a structure which may be economically produced and readily used with no modification of the apparatus as presently employed. Moreover, tape units achieving the desired results may be manufactured at minimal expense and in unlimited quantities.

With these and other objects in mind, reference is had to the attached sheet of drawings illustrating practice embodiments of the invention and in which.

Figures 1, 2, 3, 4, 5:
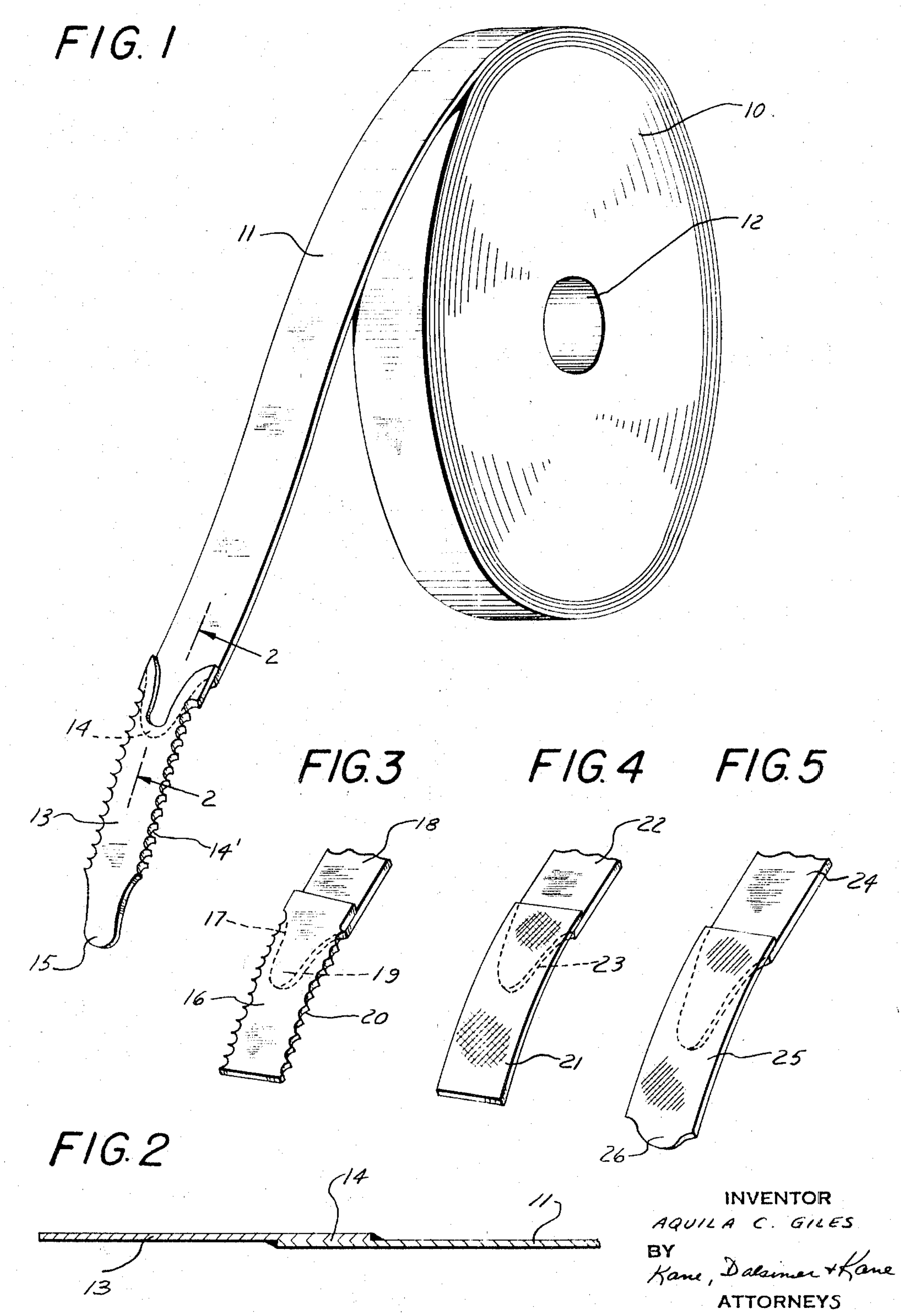
FIGURE 1 is a perspective view of one type of improved tape.
FIGURE 2 is a sectional side view taken along the line 2—2 in the direction of the arrows as indicated in FIGURE 1.
FIGURE 3 is a perspective view of a modified form of tape end embracing the present teachings.
FIGURES 4 and 5 are views similar to FIGURE 3 but showing still further forms of tape ends.

Referring to FIGURE 1, the numeral 10 indicates a body of tape disposed in the form of a spiral roll with a leading or free end portion 11. The roll conveniently defines a central aperture 12 to receive a shaft or pin for supporting the roll in a manner conventional to a stock-ticker assembly.

While the roll may be formed of any suitable material, capable of receiving indicia to be visually reproduced in enlarged scale upon a viewing screen, it will ordinarily embody a cellulose-acetate material. The present invention is primarily directed to a tape, i.e. a relatively narrow strip of material. However, it will be understood that the width of this tape might be such that, in effect, a web is provided. Therefore, the word "tape" is to be taken in an illustrative rather than a limiting sense both throughout the specification and claims.

Thus, as in FIGURE 1, the leading end of the tape to be threaded through the imprinting machine and reproducing apparatus is provided at its outer zone with a leader 13. The latter may be made of any suitable material. Preferably, however, it is made of a resilient, tough, plastic such as polyethylene. This is conveniently fused to the cellulose-acetate tape as shown at 14 in FIGURE 2; a sufficient zone of overlap existing to prevent accidental separation.

The side edges of the leader may be serrated as indicated at 14'. To facilitate threading, the outer end of this member may terminate in a tongue 15 of reduced area.

As will be understood, an operator mounting the tape in association with a machine or apparatus will have no difficulty in threading the tape through the proper guides and past the several stations involved. In so threading, the edges of the leader due to the serrations will act as a scarifier to clean any accumulation of waste material from the guides. So cleaned, the tape will not jam in the guides but will rather slide freely therethrough. Consequently, the light images appearing upon a reproducing screen will move evenly in response to any pulling action to which the tape is subjected. It will be obvious that even if no projecting apparatus is involved, a leader embodying the present teachings will assure that the tape moves through the guides and several zones of the imprinting per se.

Obviously, as in FIGURE 3, the leader 16 might be joined throughout a suitable zone of weld or fusion as indicated at 17 in this view. The forward end of the tape 18 might be reduced, as at 19 in this figure. Likewise, its edges could conveniently include serrations 20 to function in a manner similar to those at 14' in FIGURE 1.

If desired, no serrations need be included in the side edges of the leader. The outer, inner, or both faces of the latter might include surfaces involving a scarifying or cleaning action such that in the passage of the tape through the guides of the machine or apparatus, a cleaning action would result. The leader 21 as in FIGURE 4 could be substantially rectangular. The forward end of the tape 22 could be reduced in the form of a tongue as at 23 secured by welding or any other suitable adhesive matter to the tape. Also as in FIGURE 5, the forward end 24 of the tape could be similarly secured to a leader indicated at 25, the outer end of which would include a reduced or tongue portion 26.

As will be understood, not every tape fed through the apparatus need necessarily include a leader with scarifying surfaces. Rather every fifth or tenth tape may involve these characteristics and serve to clean out the inking ribbon particles and similar accumulations in the guides. Scarifying surfaces might be included in one or both of the upper and lower leader surfaces. In all instances, it is preferred that the leader have a width at least equal to that of the tape. Also, due to the double thickness at the zone of coupling between the tape and leader, a further cleaning action of critical surfaces will occur.

Thus, among others, the several objects of the invention as aforennoted are achieved. Obviously, numerous changes in construction could be resorted to without departing from the spirit of the invention as defined in the claims.

I claim:

1. A leader end for a tape element adapted for carrying information and for being wound into a multi-turn roll which, when unwound to display the information, is adapted to be transported for display through a slotted guide means comprising a leader strip of a width approximating that of the tape roll, the said leader strip having its lateral edges serrated to form a scarifying medium for cleaning the guide means prior to the movement of the remaining tape of the roll therethrough and means to secure said leader strip to one end of the tape roll.

2. The tape and leader combination claimed in claim 1 wherein the leader strip and tape are fused at their junction to form a unitary structural piece.

References Cited by the Examiner

UNITED STATES PATENTS 3,069,815 12/1962 Valentine ---------- 15—210 X

FOREIGN PATENTS 829,617 3/1960 Great Britain.

CHARLES A. WILLMUTH, *Primary Examiner.*

L. G. MACHLIN, *Assistant Examiner.*